(No Model.)
T. H. BROWN.
COMBINED SHEATHING AND LATH MACHINE.
No. 422,333. Patented Feb. 25, 1890.
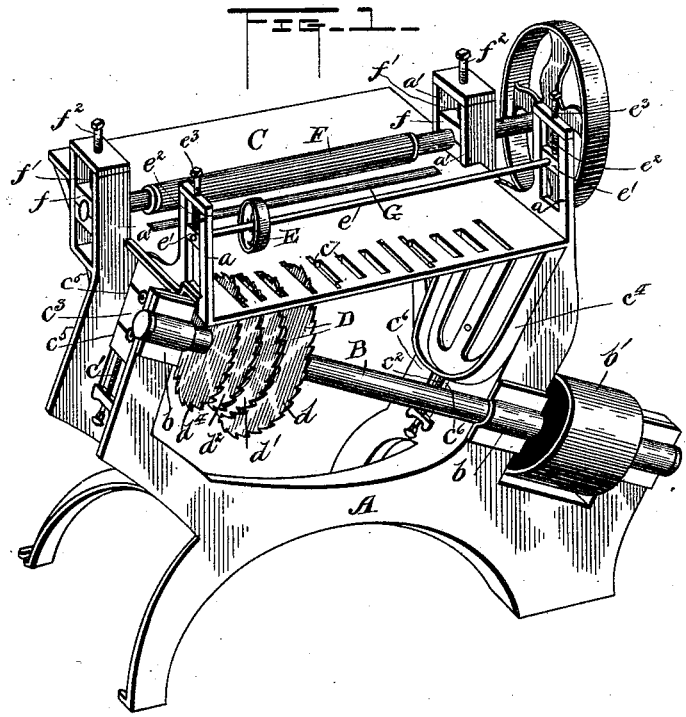
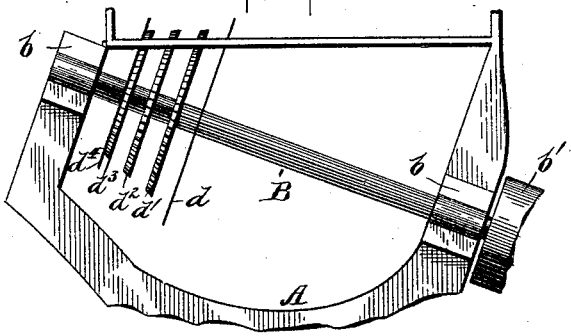
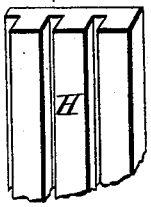
Witnesses:
Severance
H. B. Wyman
Inventor:
Theodore H. Brown,
By L. Deane
his Attorney.

UNITED STATES PATENT OFFICE.

THEODORE H. BROWN, OF VIROQUA, WISCONSIN, ASSIGNOR OF THREE-FOURTHS TO H. P. PROCTOR, O. R. SKAAR, AND HENRY C. FORSYTH, ALL OF SAME PLACE.

COMBINED SHEATHING AND LATH MACHINE.

SPECIFICATION forming part of Letters Patent No. 422,333, dated February 25, 1890.

Application filed April 22, 1889. Serial No. 308,128. (No model.)

*To all whom it may concern:*

Be it known that I, THEODORE H. BROWN, a citizen of Canada, residing at Viroqua, in the county of Vernon and State of Wisconsin, have invented certain new and useful Improvements in a Combined Sheathing and Lath Machine; and I do hereby declare the following to be a full, clear, and exact description of the invention, such as will enable others skilled in the art to which it appertains to make and use the same.

Figure 1 is a perspective view from the rear of this machine. Fig. 2 is a front elevation of the saws. Fig. 3 is a perspective view of a piece of the lath cut by this machine.

The design of this invention is to produce a machine to cut the lath or sheathing patented to me August 14, 1888, No. 387,967; and the novelty consists in the construction of the machine and in its combination of parts, all as will be now fully set forth and explained, as well as pointed out in the claims.

In the drawings, A represents the body of this machine. The saw-arbor B is diagonally journaled in the machine at $b$ $b$, and is moved by the pulley $b'$, over which runs a band connecting at any suitable point with power. On this shaft in suitable relation with the slots $c$ in the rear side of the feed-table C are the saws D. These are five in number, each of different size, as shown in Fig. 2, and each projects through its appropriate slot in the table. The lower and larger one of these saws is designated by letter $d$. The three next $d'$ $d^2$ $d^3$, each of which is thicker than $d$, are of regularly-decreasing diameter. Saw $d'$ is set at a little distance from saw $d$, and in like manner saw $d^2$ is set at a little distance from saw $d'$, and so also saw $d^3$ is set in like relation to saw $d^2$. The upper saw $d^4$ is of about the same thickness as saw $d$, but is of less diameter and of larger diameter than saw $d'$. This saw $d^4$ is set close against the side of saw $d^3$. There may be another like gang of these saws on the same shaft below the one now shown, it only being necessary for this purpose to increase the diameter of each saw correspondingly. The table C can be suitably raised or lowered to regulate the depth of the cut by means of screws $c'$ $c^2$, which pass up through the body of the machine and operate on each side against the depending parts $c^3$ $c^4$ of the table, which move, respectively, in or on the ways $c^5$ $c^6$.

The follower-roll E, which keeps the board being cut against the saws, is placed on shaft $e$, journaled at its ends in the blocks $e'$, moving in the ways in the standards $a$ $a$, which at each side of the machine project upwardly. The pressure of the roll is regulated by the spiral springs $e^2$ on the screw-bolts $e^3$. If a second gang of saws is used a second roll E properly adjusted in relation to it may be used.

Forward of the roll E is the corrugated feed-roller F, journaled at its ends in the blocks $f$, which move in ways in the upright standards $a'$ at each side of the machine, the upward movement of the blocks or the downward pressure of the roll being regulated by the tension-springs $f'$ on screw-bolts $f^2$. In this instance, as with the guide-roll, the tension of the spring can be regulated by means of the set-screw.

In the bed of the machine and parallel with the feed-roll is the roll G.

In operating the machine the work is fed upon the table C from its front side, and passes under and is drawn along by the corrugated feed-roller F over roller G in the bed of the table and under the guide-roll E. As it reaches the latter roll it meets the saws and is thus cut as it is passed along and over them, thus producing the lath or sheathing H. (Shown in Fig. 3.) By adjustment of the set-screws and tension-springs, which operate on the ends of the guide and feed-roller shafts, any proper-sized piece of wood can be run through the machine.

This machine is simple in structure and adapted to do its work in the most thorough manner, and can be operated so as to produce a very large amount of the laths or sheathing in a very short time.

Having now described my invention, what I claim is—

1. In a lath-cutting-machine as described, the combination of the saws, consisting of the lower and larger one $d$ and the three next $d'$, $d^2$, and $d^3$, of decreasing diameter and greater thickness, and the upper thin one $d^4$, of larger diameter than $d^3$ and set close against it on the inclined arbor B, with the table C, slotted at $c$, and guide-roll E and corrugated roller F, substantially as shown and described.

2. In a machine as described, the gang of saws D, composed of the series $d$ $d'$ $d^2$ $d^3$ $d^4$, each of different diameters, the lower one being a thin saw and of the largest diameter, the next three thicker and of diminishing diameters, and the upper one thin and of slightly-larger diameter than the thick saw against which it is placed, and arranged, as shown, upon the arbor B, substantially as and for the purposes set forth.

3. In combination with the table C, adjustable and slotted, as described, the saws $d$, $d'$, $d^2$, $d^3$, and $d^4$, of varying diameters and thickness, as stated, and arranged as set forth, and the inclined arbor B, carrying said saws, table-roller G, and the roll E and corrugated roller F, the shafts of each of which are operated upon by screw-bolts and tension-springs, all substantially as and for the purposes set forth.

In testimony whereof I affix my signature in presence of two witnesses.

THEODORE H. BROWN.

Witnesses:
   HAROLD PROCTOR,
   WILLIE H. TOLLEFSON.